(12) United States Patent
Kang et al.

(10) Patent No.: US 11,099,421 B2
(45) Date of Patent: Aug. 24, 2021

(54) LIQUID CRYSTAL DISPLAY DEVICE AND MANUFACTURING METHOD OF THE SAME

(71) Applicant: Samsung Display Co., Ltd., Yongin-Si (KR)

(72) Inventors: Hoon Kang, Suwon-si (KR); Yonghoon Yang, Hwaseong-si (KR); Euisuk Jung, Seoul (KR); Hyein Kim, Hwaseong-si (KR); Koichi Sugitani, Hwaseong-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/737,559

(22) Filed: Jan. 8, 2020

(65) Prior Publication Data

US 2020/0142257 A1   May 7, 2020

Related U.S. Application Data

(63) Continuation of application No. 15/673,123, filed on Aug. 9, 2017, now Pat. No. 10,534,216.

(30) Foreign Application Priority Data

Aug. 22, 2016 (KR) .................. 10-2016-0106202

(51) Int. Cl.
  *G02F 1/1335* (2006.01)
  *G02F 1/13357* (2006.01)
  (Continued)

(52) U.S. Cl.
  CPC .. *G02F 1/133528* (2013.01); *G02F 1/133512* (2013.01); *G02F 1/133553* (2013.01);
  (Continued)

(58) Field of Classification Search
  CPC ......... G02F 1/133528; G02F 1/133512; G02F 1/133553; G02F 1/133617;
  (Continued)

(56) References Cited

U.S. PATENT DOCUMENTS 9,454,027 B2   9/2016   Lee et al.
9,575,228 B2   2/2017   Kim et al.
(Continued)

FOREIGN PATENT DOCUMENTS

JP        2009-145800 A     7/2009
KR   10-2009-0087707 A     8/2009
(Continued)

*Primary Examiner* — Nathanael R Briggs
(74) *Attorney, Agent, or Firm* — Innovation Counsel LLP

(57) ABSTRACT

A liquid crystal display device and a method of manufacturing the same are provided. The LCD device includes a substrate including a display area and a non-display area, a blue light blocking filter on the substrate, a plurality of color pattern layers spaced apart from one another in a plan view, a black matrix among the plurality of color pattern layers in a plan view, a planarization layer on the color pattern layer and the black matrix, and a polarizer on the planarization layer. The color pattern layer includes a red color conversion unit on the blue light blocking filter, which converts a light into a light having a red wavelength and a green color conversion unit on the blue light blocking filter, which converts a light into a light having a green wavelength. The red color conversion unit and the green color conversion unit include wavelength converting particles.

21 Claims, 12 Drawing Sheets

(51) Int. Cl.
*G02F 1/1333* (2006.01)
*G02F 1/1362* (2006.01)
*G02F 1/1343* (2006.01)

(52) U.S. Cl.
CPC .. *G02F 1/133617* (2013.01); *G02F 1/133621*
(2013.01); *G02F 1/133357* (2021.01); *G02F 1/133519* (2021.01); *G02F 1/133548* (2021.01); *G02F 1/133614* (2021.01); *G02F 1/134309* (2013.01); *G02F 1/136222* (2021.01); *G02F 2201/121* (2013.01); *G02F 2201/123* (2013.01); *G02F 2202/36* (2013.01); *G02F 2203/055* (2013.01)

(58) Field of Classification Search
CPC ......... G02F 1/133621; G02F 1/134309; G02F 2001/133357; G02F 2001/133519; G02F 2001/133548; G02F 2001/133614; G02F 2001/2001; G02F 2001/136222; G02F 2201/121; G02F 2201/123; G02F 2202/36; G02F 2203/055
See application file for complete search history.

(56) References Cited

U.S. PATENT DOCUMENTS

| | | |
|---|---|---|
| 2007/0010036 A1 | 1/2007 | Endo et al. |
| 2009/0008731 A1 | 1/2009 | Kim |
| 2012/0154722 A1 | 6/2012 | Kang et al. |
| 2013/0033662 A1* | 2/2013 | Chung .............. G02F 1/133528 349/96 |
| 2013/0088469 A1 | 4/2013 | Yee |
| 2013/0242228 A1* | 9/2013 | Park ................... G02F 1/133617 349/61 |
| 2013/0329401 A1 | 12/2013 | Yamamoto et al. |
| 2014/0160408 A1* | 6/2014 | Cho .................. G02F 1/133617 349/110 |
| 2014/0184942 A1* | 7/2014 | Bang ............... G02F 1/133512 349/12 |
| 2016/0259205 A1 | 9/2016 | Kwak et al. |
| 2018/0067367 A1* | 3/2018 | Yu ..................... G02F 1/136209 |

FOREIGN PATENT DOCUMENTS

| | | |
|---|---|---|
| KR | 10-2014-0074495 A | 6/2014 |
| KR | 10-2015-0116022 A | 10/2015 |
| KR | 10-2015-0136684 A | 12/2015 |

\* cited by examiner

LIQUID CRYSTAL DISPLAY DEVICE AND MANUFACTURING METHOD OF THE SAME

CROSS-REFERENCE TO RELATED APPLICATION

This application is a continuation application of U.S. patent application Ser. No. 15/673,123 filed on Aug. 9, 2017, which claims priority under 35 USC § 119 to Korean Patent Application No. 10-2016-0106202, filed on Aug. 22, 2016, in the Korean Intellectual Property Office, the disclosures of which are incorporated herein in their entirety by reference.

BACKGROUND

1. Field

Exemplary embodiments of the invention relate to a liquid crystal display ("LCD") device and a method of manufacturing the LCD device, and more particularly, to an LCD device that may improve a step difference occurring in an upper panel and to a method of manufacturing the LCD device.

2. Description of the Related Art

Liquid crystal display ("LCD") devices are one of most widely used types of flat panel display ("FPD") devices. An LCD device includes two substrates including two electrodes respectively formed thereon and a liquid crystal layer interposed therebetween.

Upon applying voltage to the two electrodes, liquid crystal molecules of the liquid crystal layer are rearranged such that an amount of transmitted light is controlled in the LCD device. To this end, a backlight unit that provides light is needed in the LCD device.

Light emitted from the backlight unit passes through a polarizer and the liquid crystal layer of the LCD device to display an image. The polarizer of the LCD device may be disposed in a display panel. In such an example, in order to improve polarization efficiency of the polarizer, it is necessary that a layer below the polarizer has excellent flatness.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Exemplary embodiments of the invention are directed to a liquid crystal display ("LCD") device that may improve flatness of a display panel, in particular, in a layer below a polarizer, and to a method of manufacturing such an LCD device.

According to an exemplary embodiment of the invention, a liquid crystal display device includes: a substrate including a display area and a non-display area; a blue light blocking filter on the substrate; a plurality of color pattern layers spaced apart from one another in a plan view, the plurality of color pattern layers on the blue light blocking filter; a black matrix among the plurality of color pattern layers in a plan view; a planarization layer on the color pattern layer and the black matrix; and a polarizer on the planarization layer. The color pattern layer includes: a red color conversion unit on the blue light blocking filter, the red color conversion unit configured to convert a light into a light having a red wavelength; and a green color conversion unit on the blue light blocking filter, the green color conversion unit configured to convert a light into a light having a green wavelength, and the red color conversion unit and the green color conversion unit include wavelength converting particles.

The polarizer may include a linear polarizer, and the linear polarizer may be a wire grid polarizer (WGP).

The wavelength converting particle may include at least one of: a phosphor, a quantum dot particle, or a quantum rod particle.

The liquid crystal display device may further include a light source unit configured to emit a blue light; and a transparent pattern layer spaced apart from the blue light blocking filter in a plan view to contact the substrate.

The black matrix may be further disposed between the color pattern layer and the transparent pattern layer.

The liquid crystal display device may further include a light source unit configured to emit an ultraviolet light. The color pattern layer may further include a blue color conversion unit spaced apart from the blue light blocking filter in a plan view to contact the substrate and configured to convert a light into a light having a blue wavelength.

The liquid crystal display device may further include a dichroic reflection layer among the black matrix and the blue light blocking filter, the color pattern layer, and the transparent pattern layer.

The liquid crystal display device may further include a dichroic reflection layer among the planarization layer and the blue light blocking filter, the color pattern layer, the transparent pattern layer, and the black matrix.

The black matrix may include a metal.

The liquid crystal display device may further include a dummy pattern in the non-display area of the substrate.

According to an exemplary embodiment of the invention, a method of manufacturing a liquid crystal display device includes: forming a blue light blocking filter on a substrate; forming a color pattern layer and a transparent pattern layer on the substrate; forming a black matrix on the substrate; forming a planarization layer on the substrate; and forming a polarizer on the substrate. The color pattern layer includes wavelength converting particles.

The method may further include forming a dichroic reflection layer on the substrate before forming the planarization layer.

The method may further include forming a dichroic reflection layer on the substrate before forming the polarizer.

Forming of the black matrix may include: coating a black matrix forming material; coating a photoresist; developing the photoresist; etching the black matrix forming material; and stripping the photoresist. Wherein the black matrix forming material may include a metal.

Forming of the color pattern layer and the transparent pattern layer on the substrate may further include: forming a dummy pattern.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
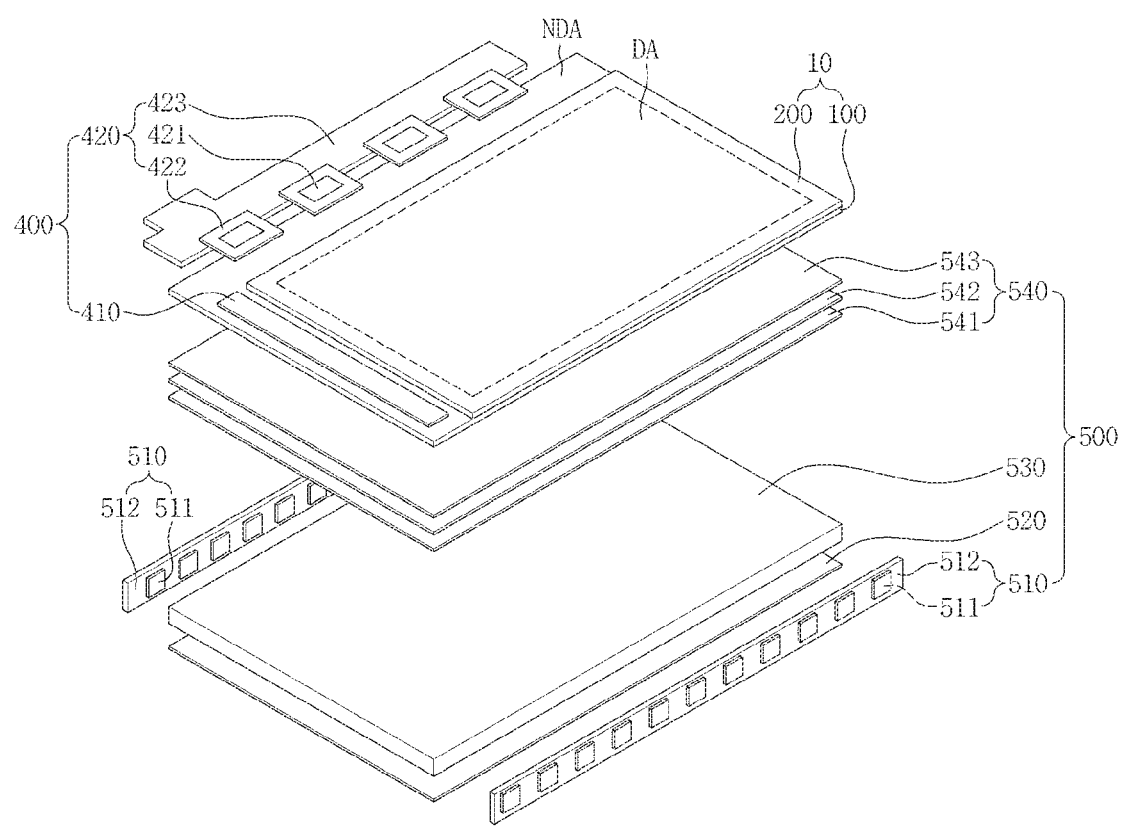
FIG. 1 is an exploded perspective view illustrating a liquid crystal display ("LCD") device according to a first exemplary embodiment.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present inventive concept, and like reference numerals refer to like elements throughout the specification.

Hereinafter, a display device according to a first exemplary embodiment will be described in detail with reference to FIGS. 1 to 5B.

FIG. 1 is an exploded perspective view illustrating a liquid crystal display ("LCD") device according to the first exemplary embodiment.

The LCD device includes a display panel 10, a driving unit 400, and a backlight unit 500.

The display panel 10 includes a lower panel 100, an upper panel 200, and a liquid crystal layer (not illustrated).

The driving unit 400 includes a gate driver 410 and a data driver 420. The gate driver 410 is in a non-display area NDA of the lower panel 100. The gate driver 410 generates gate signals based on a gate control signal applied from a timing controller (not illustrated), and sequentially applies the gate signals to a plurality of gate lines. The gate driver 410 may include a shift register that shifts a gate start pulse based on a gate shift clock to generate the gate signals. The shift register may include a plurality of driving thin film transistors ("TFT").

The data driver 420 includes a plurality of data driving integrated circuits 421. The data driving integrated circuits 421 receive digital image data signals and a data control signal from the timing controller. The data driving integrated circuits 421 sample the digital image data signals according to the data control signal, latch the sampled image data signals corresponding to one horizontal line in each horizontal period, and apply the latched image data signals to data lines DL1 to DLj to be described below. That is, the data driving integrated circuits 421 convert the digital image data signals applied from the timing controller into analog image signals, using a gamma voltage input from a power supply (not illustrated), and apply the converted analog image signals to the data lines DL1 to DLj.

Each of the data driving integrated circuits 421 is mounted on a carrier 422. The carriers 422 are connected between a printed circuit board ("PCB") 423 and the display panel 10. The aforementioned timing controller and the power supply may be disposed on the PCB 423, and the carrier 422 includes input wirings which transmit various signals applied from the timing controller and the power supply to the data driving integrated circuits 421 and output wirings which transmit image data signals output from the data driving integrated circuits 421 to corresponding ones of the data lines DL1 to DLj. In an exemplary embodiment, at least one carrier 422 may further include auxiliary wirings which may transmit various signals applied from the timing controller and the power supply to the gate driver 410, and the auxiliary wirings are connected to panel wirings on the lower panel 100. The panel wirings connect the auxiliary wirings and the gate driver 410. The panel wirings may be disposed on the lower panel 100 in a line-on-glass manner.

The backlight unit 500 includes a light source unit 510, a reflection plate 520, a light guide plate 530, and an optical sheet 540.

The light source unit 510 generates light. The light generated in the light source unit 510 is provided to the display panel 10 through the light guide plate 530 and the optical sheet 540.

The light source unit 510 may include at least one light source 511 and a light source circuit board 512. The light source 511 may emit ultraviolet ("UV") light and rear UV light, for example. For example, the light source 511 may emit UV light or blue light to the display panel 10 through the light guide plate 530 to be described below.

A surface of the light source circuit board 512, although not illustrated, is divided into at least one mounting area and a wiring area. In a case that two or more light sources 511 are provided, respective ones of the light sources 511 are disposed in the mounting areas, and a plurality of wirings to transmit a driving power to the light sources 511 are disposed in the wiring area. The driving power is generated from an external power supply (not illustrated), and then applied to the plurality of wirings through a separate connector (not illustrated).

The light guide plate 530 guides light generated in the light source unit 510 to the display panel 10. The light guide plate 530 is disposed among the plurality of light source units 510. One of a plurality of surfaces included in the light guide plate 530 that faces the light source 511 is defined as a light incidence surface.

The light emitted from the light source 511 is incident to the light incidence surface and propagates inwardly in the light guide plate 530. The light guide plate 530 totally reflects the light propagating therein to guide it toward a display area of the display panel 10. In an exemplary embodiment, although not illustrated, in order to improve reflectance of the light guide plate 530, a plurality of scattering patterns may further be formed on a lower outer surface of the light guide plate 530.

The light guide plate 530 may include or be formed of a material having light transmittance, e.g., an acrylic resin, such as polymethylmethacrylate (PMMA), and polycarbonate (PC), so as to guide light efficiently.

The reflection plate 520 is disposed below the light guide plate 530. The reflection plate 520 reflects, once again, a light transmitted through a lower outer surface of the light guide plate 530 and dissipated outwards to be directed toward the light guide plate 530, thus significantly reducing light loss.

The optical sheet 540 diffuses and collimates light guided thereto from the light guide plate 530. The optical sheet 540 may be disposed between the light guide plate 530 and the display panel 10. The optical sheet 540 may include a diffusion sheet 541, a collimation sheet 542, and a protection sheet 543. The diffusion sheet 541, the collimation sheet 542, and the protection sheet 543 may be sequentially stacked on the light guide plate 530.

The diffusion sheet 541 serves to diffuse light guided from the light guide plate 530 so as to prevent the light from being partially concentrated.

The collimation sheet 542 is disposed on the diffusion sheet 541 and serves to collimate the light diffused by the diffusion sheet 541 in a direction perpendicular to the display panel 10. To this end, prisms having a triangular cross-section may be disposed into a predetermined arrangement on a surface of the collimation sheet 542.

The protection sheet 543 is disposed on the collimation sheet 542 and serves to protect a surface of the collimation sheet 542 and diffuse light to achieve uniform light distribution. A light transmitted through the protection sheet 543 is directed to the display panel 10.

Figure 2:
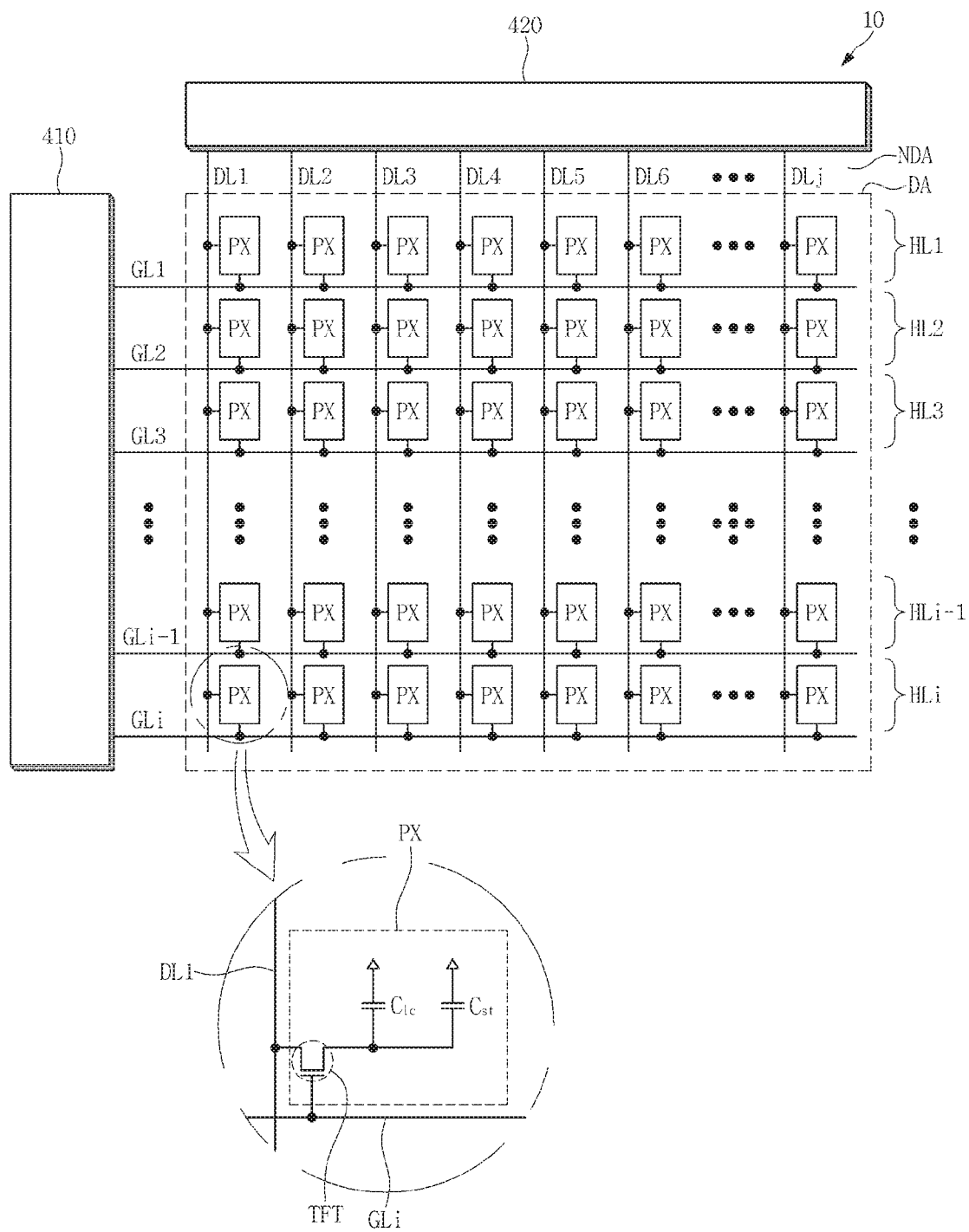
FIG. 2 is a view illustrating pixels of a display panel.

FIG. 2 is a view illustrating pixels of a display panel.

Referring to FIGS. 1 and 2, the display panel 10 includes a plurality gate lines GL1 to GLi and a plurality of data lines DL1 to DLj. The data lines DL1 to DLj intersect the gate lines GL1 to GLi. The gate lines GL1 to GLi extend to the non-display area NDA to be connected to the gate driver 410, and the data lines DL1 to DLj extend to the non-display area NDA to be connected to the data driver 420.

As illustrated in FIG. 2, the pixel PX is disposed in the display area DA of the display panel 10. Adjacent ones of the pixels PX may form a single unit pixel. For example, adjacent ones of the plurality of pixels PX that are connected to a same gate line may form a single unit pixel.

Adjacent ones of the pixels PX may be connected to different data lines. For example, as illustrated in FIG. 2, one pixel PX may be connected to an odd-numbered data line, and another pixel PX adjacent to the one pixel may be connected to an even-numbered data line.

There are "j" number of pixels PX arranged along an n-th (n is one selected from 1 to i) horizontal line (hereinafter, n-th horizontal line pixels), which are connected to the first to j-th data lines DL1 to DLj, respectively. Further, the n-th horizontal line pixels are connected to the n-th gate line in common. Accordingly, the n-th horizontal line pixels receive an n-th gate signal as a common signal. That is, "j" number of pixels disposed in a same horizontal line receive a same gate signal, while pixels disposed in different horizontal lines receive different gate signals, respectively. For example, the entirety of pixels PX disposed in the first horizontal line HL1 receive a first gate signal while pixels PX disposed in the second horizontal line HL2 receive a second gate signal which has different timing from that of the first gate signal.

Each of the pixels PX includes a TFT, a liquid crystal capacitor Clc, and a storage capacitor Cst.

As illustrated in FIG. 2 in an enlarged manner, the TFT is turned on based on a gate signal applied from the gate line GLi. The turned-on TFT applies an analog image data signal applied from the data line DL1 to the liquid crystal capacitor Clc and the storage capacitor Cst.

The liquid crystal capacitor Clc includes a pixel electrode and an opposing electrode that oppose each other. Herein, the opposing electrode may be a previous gate line or a common line that transmits a common voltage.

Figure 3:
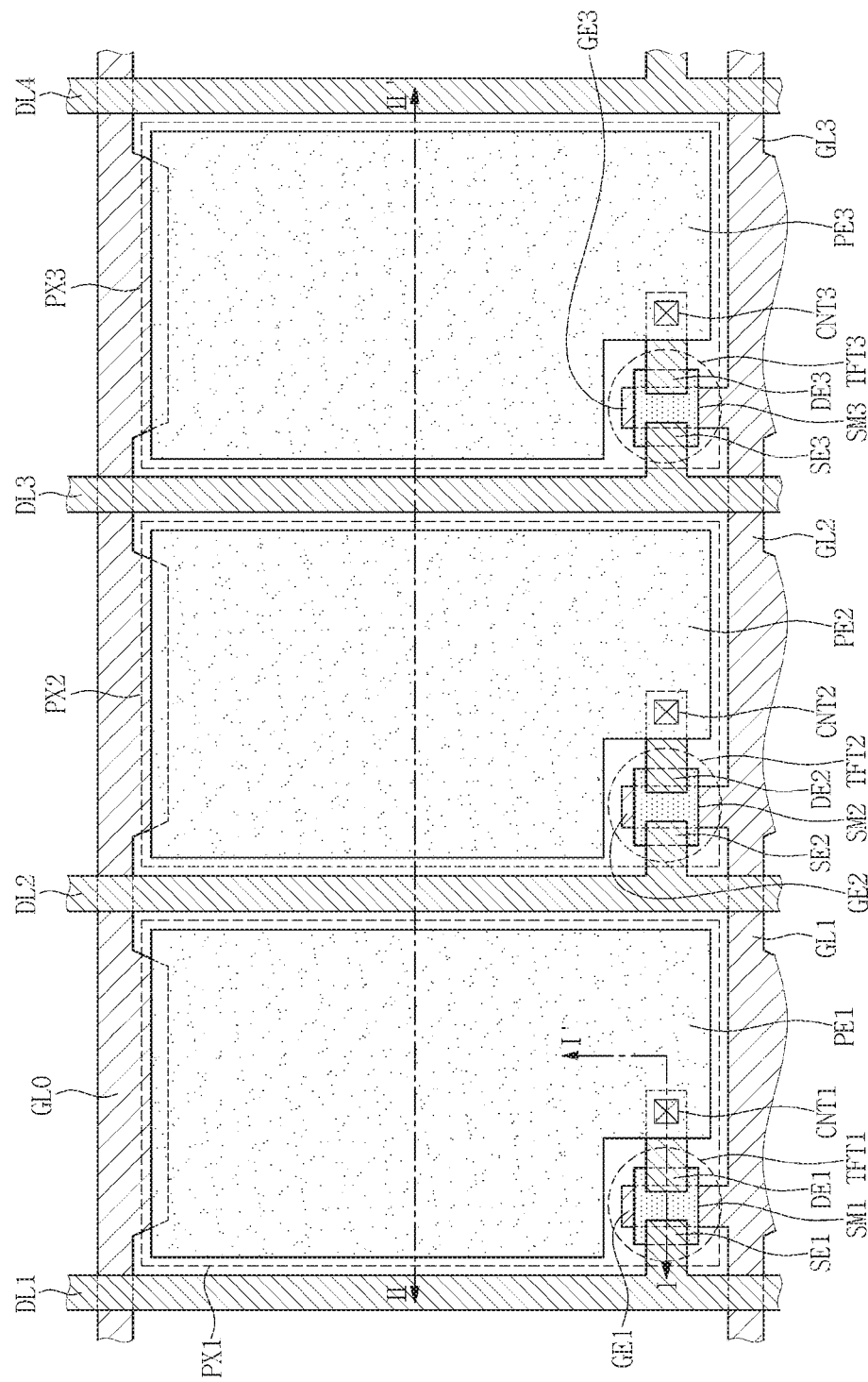
FIG. 3 is a plan view illustrating three adjacent pixels of FIG. 2.
Figure 4A:
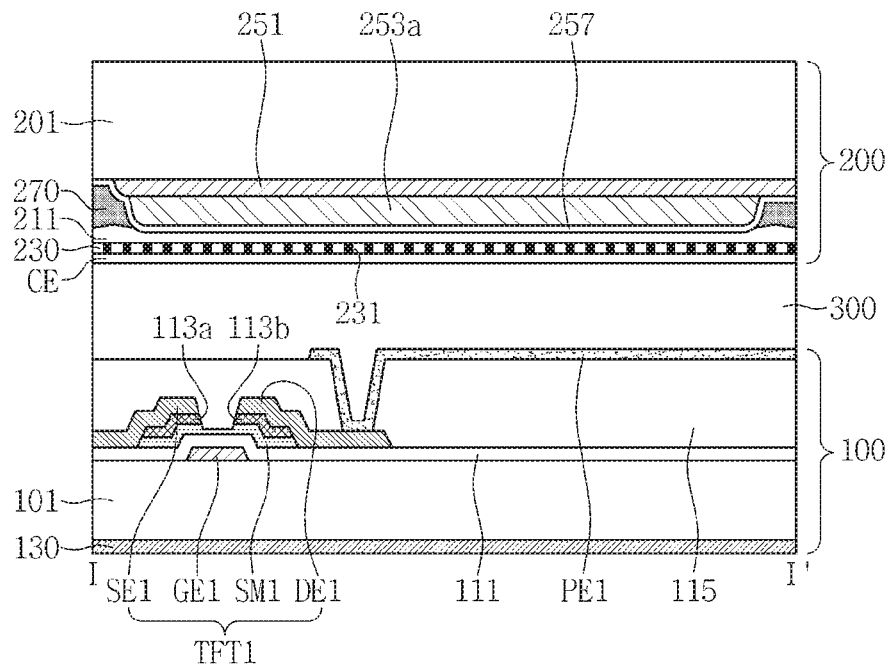
FIG. 4A is a cross-sectional view illustrating the first exemplary embodiment taken along line I-I' of FIG. 3.
Figure 4B:
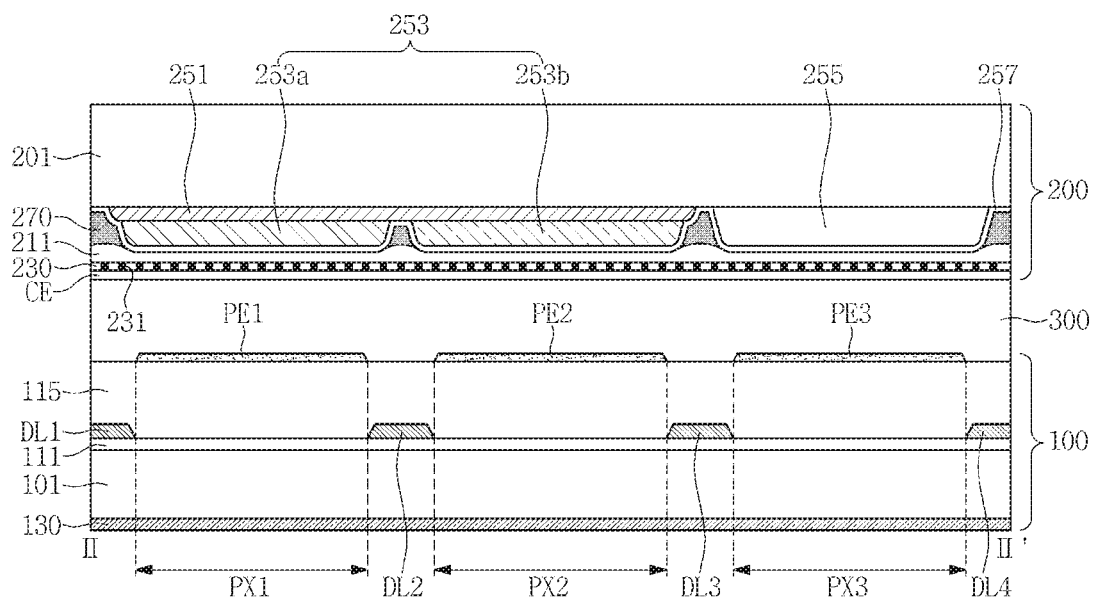
FIG. 4B is a cross-sectional view illustrating the first exemplary embodiment taken along line II-II' of FIG. 3.

FIG. 3 is a plan view illustrating three adjacent pixels of FIG. 2, FIG. 4A is a cross-sectional view illustrating the first exemplary embodiment taken along line I-I' of FIG. 3, and FIG. 4B is a cross-sectional view illustrating the first exemplary embodiment taken along line II-II' of FIG. 3.

The display panel 10 according to the first exemplary embodiment, as illustrated in FIGS. 3 and 4B, includes a lower polarizer 130, a lower substrate 101, thin film transistors TFT1, TFT2, and TFT3, pixel electrodes PE1, PE2, and PE3, a gate insulating layer 111, a protection layer 115, a liquid crystal layer 300, a common electrode CE, an upper polarizer 230, a planarization layer 211, a blue light blocking filter 251, a color pattern layer 253, a transparent pattern layer 255, a dichroic reflection layer 257, a black matrix 270, and an upper substrate 201.

The lower panel 100 includes the lower substrate 101, the thin film transistors TFT1, TFT2, and TFT3, the gate insulating layer 111, the protection layer 115, the pixel electrodes PE1, PE2, and PE3, and the lower polarizer 130.

The lower substrate 101 may include transparent materials such as glass or plastic.

The thin film transistors TFT1, TFT2, and TFT3 include semiconductor layers SM1, SM2, and SM3, gate electrodes GE1, GE2, and GE3, source electrodes SE1, SE2, and SE3, and drain electrodes DE1, DE2, and DE3, respectively.

The gate electrodes GE1, GE2, and GE3 may be unitary with the gate line GL1. The gate electrodes GE1, GE2, and GE3 are disposed on the lower substrate 101. At least one of the gate line GL1 and the gate electrodes GE1, GE2, and GE3 may include or be formed of aluminum (Al) or alloys thereof, silver (Ag) or alloys thereof, copper (Cu) or alloys thereof, and/or molybdenum (Mo) or alloys thereof. In an alternative exemplary embodiment, at least one of the gate line GL1 and the gate electrodes GE1, GE2, and GE3 may include or be formed of one of chromium (Cr), tantalum (Ta), and titanium (Ti). In an alternative exemplary embodiment, at least one of the gate line GL1 and the gate electrodes GE1, GE2, and GE3 may have a multilayer structure including at least two conductive layers that have different physical properties from one another.

In an exemplary embodiment, a line GL0 illustrated in FIG. 3 is a dummy gate line, and the dummy gate line GL0 is disposed on substantially a same layer as a layer on which the gate line GL1 is disposed. The dummy gate line GL0 overlaps the pixel electrodes PE1, PE2, and PE3 of the pixels PX1, PX2, and PX3 connected to the first gate line GL1. The aforementioned storage capacitors Cst are formed among the dummy gate line GL0 and the pixel electrodes PE1, PE2, and PE3 of the pixels PX1, PX2, and PX3, respectively. The dummy gate line GL0 may include substantially a same material as that included in the gate line GL1.

The gate insulating layer 111 is disposed over an entire surface of the lower substrate 101 including the gate line GL1 and the gate electrodes GE1, GE2, and GE3. The gate insulating layer 111 may include or be formed of silicon nitride (SiNx) or silicon oxide (SiOx). In an alternative exemplary embodiment, the gate insulating layer 111 may have a multilayer structure including at least two insulating layers having different physical properties.

The semiconductor layers SM1, SM2, and SM3 are disposed on the gate insulating layer 311. In such an exemplary embodiment, the semiconductor layers SM1, SM2, and SM3 overlap the gate electrodes GE1, GE2, and GE3 below the gate insulating layer 111. The semiconductor layers SM1, SM2, and SM3 may include amorphous silicon, polycrystalline silicon, or the like.

First and second ohmic contact layers 113a and 113b may be disposed on the semiconductor layers SM1, SM2, and SM3. For example, the first and second ohmic contact layers 113a and 113b may be disposed on portions of the semiconductor layers SM1, SM2, and SM3 other than channel areas of the semiconductor layers SM1, SM2, and SM3. The first ohmic contact layer 113a and the second ohmic contact layer 113b are separated from each other. Each of the first and second ohmic contact layers 113a and 113b may include silicide or n+ hydrogenated amorphous silicon doped with n-type impurities, e.g., phosphorus (P), at high concentration.

The source electrode SE and the data lines DL1, DL2, and DL3 are unitary. The source electrode SE is disposed on the first ohmic contact layer 113a.

The drain electrodes DE1, DE2, and DE3 are disposed on the second ohmic contact layer 113b. The drain electrodes DE1, DE2, and DE3 are connected to the pixel electrodes PE1, PE2, and PE3.

At least one of the data lines DL1, DL2, DL3, and DL4, the source electrodes SE1, SE2, and SE3, and the drain electrodes DE1, DE2, and DE3 may include or be formed of a refractory metal, such as molybdenum, chromium, tantalum, and titanium, or an alloy thereof. In an alternative exemplary embodiment, at least one of the data lines DL1, DL2, DL3, and DL4, the source electrodes SE1, SE2, and SE3, and the drain electrodes DE1, DE2, and DE3 may have a multilayer structure including a refractory metal layer and a low-resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an alternative exemplary embodiment, at least one of the data lines DL1, DL2, DL3, and DL4, the source electrodes SE1, SE2, and SE3, and the drain electrodes DE1, DE2, and DE3 may include or be formed of any suitable metals or conductors rather than the aforementioned materials.

The protection layer 115 is disposed over an entire surface of the lower substrate 101 including the data lines DL1, DL2, and DL3, the source electrodes SE1, SE2, and SE3, and the drain electrodes DE1, DE2, and DE3. The protection layer 115 may include an inorganic insulating material such as silicon nitride ($SiN_x$) or silicon oxide ($SiO_x$), and in such an exemplary embodiment, an inorganic insulating material having photosensitivity and having a dielectric constant of about 4.0 may be used. In an exemplary embodiment, the protection layer 115 may have a double-layer structure including a lower inorganic layer and an upper organic layer, which is found to impart excellent insulating properties of the organic layer and does not damage an exposed portion of the semiconductor layers SM1, SM2, and SM3. The protection layer 115 may have a thickness greater than or equal to about 5000 Å, e.g., in a range of about 6000 Å to about 8000 Å.

The pixel electrodes PE1, PE2, and PE3 are disposed on the protection layer 115. In such an exemplary embodiment, the pixel electrodes PE1, PE2, and PE3 are connected to the drain electrodes DE1, DE2, and DE3 through a contact hole CNT defined in the protection layer 115. The pixel electrodes PE1, PE2, and PE3 may include or be formed of a transparent conductive material, such as indium tin oxide (ITO) or indium zinc oxide (IZO). Herein, ITO may be a polycrystalline or monocrystalline material, and IZO may be a polycrystalline or monocrystalline material as well.

The lower polarizer 130 is disposed on a lower surface of the lower substrate 101.

The upper panel 200 includes the upper substrate 201, the blue light blocking filter 251, the color pattern layer 253, the transparent pattern layer 255, the black matrix 270, the planarization layer 211, the upper polarizer 230, and the common electrode CE.

The upper substrate 201 may include transparent materials such as glass or plastic.

The blue light blocking filter 251 is disposed on the upper substrate 201 to be spaced apart from the transparent pattern layer 255, to be described below, in a plan view. For example, as illustrated in FIG. 4B, the blue light blocking filter 251 may be disposed corresponding to two pixels PX1 and PX2. The blue light blocking filter 251 may have a stripe shape. In an alternative exemplary embodiment, the blue light blocking filter 251 may have an island shape.

The color pattern layer 253 converts a wavelength of a light incident thereto from the backlight unit 500 to emit a light of a different wavelength.

The plurality of color pattern layers 253 may be spaced apart from one another in a plan view. The color pattern layer 253 includes a red color conversion unit 253a and a green color conversion unit 253b, and the red color conversion unit 253a and the green color conversion unit 253b may be disposed on the blue light blocking filter 251 to be spaced apart from one another in a plan view.

The plurality of color pattern layers 253 may have a stripe shape. In an alternative exemplary embodiment, the plurality of color pattern layers 253 may have an island shape.

The color pattern layer 253 includes wavelength converting particles (not illustrated). For example, the wavelength converting particle may include quantum dot particles. A quantum dot particle converts a wavelength of light to emit a light of a predetermined wavelength. A wavelength of light emitted from the color pattern layer 253 may vary based on the size of the quantum dot particle. In other words, lights having different color wavelengths are emitted from the color pattern layer 253 based on a diameter of the quantum dot particle.

The quantum dot particle may have a diameter ranging from about 2 nm to about 10 nm. In general, as a diameter of the quantum dot particle decreases, a wavelength of emitted light is shortened to emit a blue-based light, and as the diameter of the quantum dot particle increases, the wavelength of emitted light is lengthened to emit a red-based light. For example, a quantum dot particle having a diameter of about 10 nm may emit a red light, a quantum dot particle having a diameter of about 7 nm may emit a green light, and a quantum dot particle having a diameter of about 5 nm may emit a blue light.

Having a high quantum yield and a high extinction coefficient, as compared to those of general fluorescent dyes, the quantum dot particle may emit significantly intense fluorescent light. In particular, the quantum dot particle may absorb a light of a short wavelength and emit a light of a longer wavelength.

The quantum dot particle may have a structure including a core nanocrystal and a shell nanocrystal surrounding the core nanocrystal. In an exemplary embodiment, the quantum dot particle may include an organic ligand bonded to the shell nanocrystal, and may further include an organic coating layer surrounding the shell nanocrystal.

The shell nanocrystal may have two or more layers. The shell nanocrystal is formed on a surface of the core nanocrystal.

The quantum dot particle may include at least one substance of group II compound semiconductors, group III compound semiconductors, group V compound semiconductors, and group VI compound semiconductors. For example, the core nanocrystal forming the quantum dot particle may include at least one of: PbSe, InAs, PbS, CdSe, InGaP, CdTe, CdS, ZnSe, ZnTe, ZnS, HgTe and HgS. Further, the shell nanocrystal may include at least one of: CuZnS, CdSe, CdTe, CdS, ZnSe, ZnTe, ZnS, HgTe and HgS.

For example, in a case where the core nanocrystal includes CdSe, blue light may be emitted when a diameter of the quantum dot particle is in a range of about 1 nm to about 3 nm, green light may be emitted when the diameter of the quantum dot particle is in a range of about 3 nm to about 5 nm, and red light may be emitted when the diameter of the quantum dot particle is in a range of about 7 nm to about 10 nm.

The quantum dot particle may be fabricated by a wet-chemical method whereby a precursor material is put into an organic solvent so that a particle may grow.

In an alternative exemplary embodiment, the color pattern layer 253 may include quantum rod particles in lieu of the quantum dot particles.

For example, the red color conversion unit 253a converts a wavelength of blue light incident thereto from the backlight unit 500 to emit a light having a red wavelength, and the green color conversion unit 253b converts a wavelength of blue light incident thereto from the backlight unit 500 to emit a light having a green wavelength. For example, the red color conversion unit 253a includes a red wavelength converting particle to convert blue light incident thereto from the backlight unit 500 into a light having a red wavelength. The red wavelength may be in a range from about 620 nm to about 750 nm. In addition, the green color conversion unit 253b includes a green wavelength converting particle to convert blue light incident thereto from the backlight unit 500 into a light having a green wavelength. The green wavelength may be in a range from about 495 nm to about 570 nm. Accordingly, the red color conversion unit 253a may correspond to a red pixel, and the green color conversion unit 253b may correspond to a green pixel.

The transparent pattern layer 255 is spaced apart from the blue light blocking filter 251 and contacts the upper substrate 201. In addition, the transparent pattern layer 255 may be disposed corresponding to a pixel PX3.

The transparent pattern layer 255 may have a stripe shape. Alternatively, the transparent pattern layer 255 may have an island shape. The transparent pattern layer 255 may include a transparent material through which light may be transmitted.

The transparent pattern layer 255 does not include a wavelength converting particle. A light transmitted through the transparent pattern layer 255 does not experience a wavelength change. For example, the transparent pattern layer 255 does not convert a wavelength of blue light incident thereto from the backlight unit 500. In such an exemplary embodiment, the transparent pattern layer 255 may correspond to a blue pixel.

Although not illustrated, in a case where the backlight unit 500 emits UV light, the color pattern layer 253 may further include a blue color conversion unit (not illustrated). The blue color conversion unit may be disposed in a position corresponding to the transparent pattern layer 255. For example, the blue color conversion unit may be spaced apart from the blue light blocking filter 251 and contact the upper substrate 201. In addition, the blue color conversion unit may be disposed corresponding to a pixel PX3.

The blue color conversion unit includes wavelength converting particles. For example, the blue color conversion unit may include a blue wavelength converting particle to convert UV light incident thereto from the backlight unit 500 into a light having a blue wavelength. The blue wavelength may be in a range from about 450 nm to about 495 nm. Accordingly, the blue color conversion unit may correspond to a blue pixel.

The dichroic reflection layer 257 may be disposed over an entire surface of the upper substrate 201 including the blue light blocking filter 251, the color pattern layer 253, and the transparent pattern layer 255. For example, the dichroic reflection layer 257 may be disposed among the black matrix 270 and the upper substrate 201, the blue light blocking filter 251, the color pattern layer 253, and the transparent layer 255. The dichroic reflection layer 257 serves as a dichroic filter. The dichroic filter is a filter that transmits light having a predetermined wavelength among incident light, and reflects light of another wavelength other than the predetermined wavelength.

For example, the dichroic reflection layer 257 according to the first exemplary embodiment may transmit blue light and reflect light other than the blue light. In such an exemplary embodiment, light incident thereto from the backlight unit 500 is transmitted through the dichroic reflection layer 257. However, red light and green light that have been converted, by the color pattern layer 253, in terms of wavelength are reflected from the dichroic reflection layer 257. Accordingly, the dichroic reflection layer 257 is also referred to as a yellow reflection filter YRF.

For example, as the red light and the green light are reflected from the dichroic reflection layer 257, among the red light and the green light generated in the color conversion layer 230, light directed toward the liquid crystal layer 300 is reflected by the dichroic reflection layer 257 toward the upper substrate 201 to be emitted outwards. Accordingly, light efficiency of the LCD display device may be improved.

The dichroic reflection layer 257 includes a plurality of high refractive index layers and a plurality of low refractive index layers that are alternately stacked. Due to a multilayer interference phenomenon arising from the plurality of high refractive index layers and the plurality of low refractive index layers, the dichroic reflection layer 257 may achieve selective light transmittance. The low refractive index layer may include at least one of $MgF_2$ and $SiO_2$, and the high refractive index layer may include at least one of Ag, $TiO_2$, $Ti_2O_3$, and $Ta_2O_3$, but exemplary embodiments are not limited thereto. A thickness of each layer may be designed in a range of about ⅛ to about ½ of a wavelength of transmitted light.

Based on a structure of each layer included in the dichroic reflection layer 257, a wavelength of a transmitted light and a wavelength of a reflected light may be adjusted.

The black matrix 270 is disposed among the plurality of color pattern layers 253. For example, as illustrated in FIG. 4B, the black matrix 270 may be disposed between the red color conversion unit 253a and the green color conversion unit 253b, between the green color conversion unit 253b and the transparent pattern layer 255, and between the transparent pattern layer 255 and the red color conversion unit 253a. Accordingly, the black matrix 270 may significantly reduce color mixture by preventing light transmitted through one color pattern layer 253 or one transparent pattern layer 255 from being incident to another color pattern layer 253 or another transparent pattern layer 255.

The black matrix 270 blocks light incident thereto from the backlight unit 500 from being emitted toward a front surface of the display panel 10.

The black matrix 270 is disposed in an area at which a step difference between the color pattern layer 253 and the transparent pattern layer 255 occurs, so as to reduce the step difference of the upper substrate 201 including the color pattern layer 253 and the transparent pattern layer 255, thereby improving flatness of the upper substrate 201.

The black matrix 270 may include a non-photosensitive organic material. In such an exemplary embodiment, the black matrix 270 may include a material soluble in a developing solution. However, exemplary embodiments are not limited thereto, and the black matrix 270 may include a photosensitive organic material.

The planarization layer 211 is disposed on the color pattern layer 253, the transparent pattern layer 255, and the black matrix 270. The planarization layer 211 may planarize a surface of a layer therebelow, such as the color pattern layer 253, the transparent pattern layer 255, and the black matrix 270, and may prevent exudation of undesired materials from the layer therebelow.

The upper polarizer 230 is disposed on the planarization layer 211. A transmission axis of the upper polarizer 230 and a transmission axis of the lower polarizer 130 are orthogonal to each other, and one of the transmission axes thereof is parallel to the gate line GL.

The upper polarizer 230 may include a linear polarizer 231. The linear polarizer 231 includes a plurality of linear patterns parallel to the planarization layer 211. The linear patterns each have a straight line shape extending in one direction, each have a predetermined width, and are spaced apart from one another at a predetermined distance.

The linear pattern may include a metal. The linear polarizer 231 including the plurality of linear metal patterns may be referred to as a wire grid polarizer (WGP). The linear polarizer 231 according to the first exemplary embodiment is a WGP.

The linear pattern may include at least one selected from the group consisting of: aluminum (Al), gold (Au), silver (Ag), copper (Cu), chromium (Cr), iron (Fe), and/or nickel (Ni).

The linear polarizer 231 may be formed by methods such as an imprinting method using a mold or a photolithography method, but the first exemplary embodiment is not limited thereto. The linear polarizer 231 may be formed using a block copolymer.

Since including the linear patterns that are significantly thin and uniform, the linear polarizer 231 may obtain excellent polarization efficiency when disposed on the planarization layer 211 having excellent flatness.

The common electrode CE is disposed on the upper polarizer 230. For example, the common electrode CE may be disposed over an entire surface of the upper substrate 201 including the upper polarizer 230. For example, the common electrode CE transmits a common voltage which is a direct current (DC) voltage. In an alternative exemplary embodiment, the common electrode CE may transmit an alternating current (AC) voltage. The common electrode CE may include a transparent conductive material such as ITO or IZO.

The common electrode CE, along with the pixel electrode PE, applies an electric field over the liquid crystal layer 300. Accordingly, an electric field is formed over the liquid crystal layer 300 between the common electrode CE and the pixel electrode PE.

The liquid crystal layer 300 includes liquid crystal molecules, and the liquid crystal molecules may have a negative dielectric constant and may be vertically aligned.

Figure 5A:
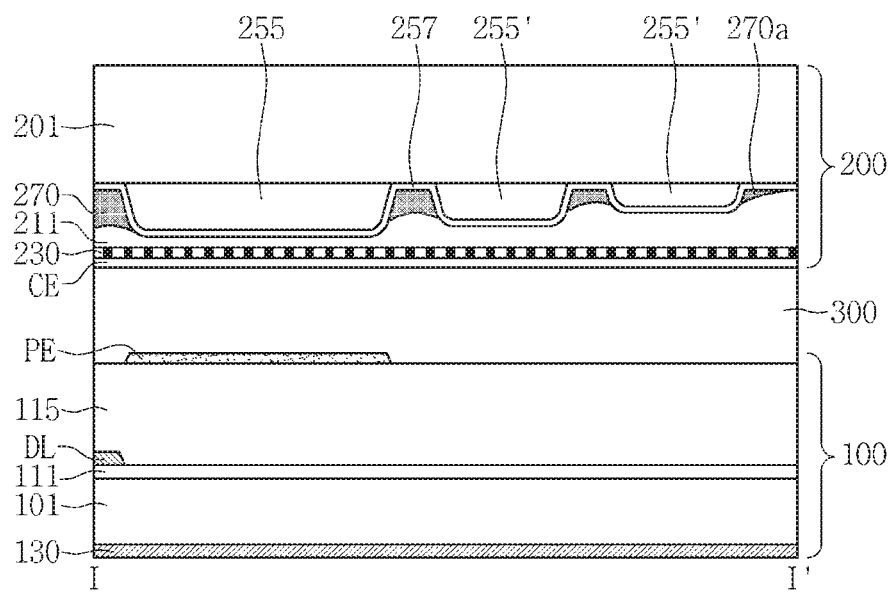
FIGS. 5A and 5B are cross-sectional views illustrating a non-display area of a display panel according to the first exemplary embodiment.
Figure 5B:
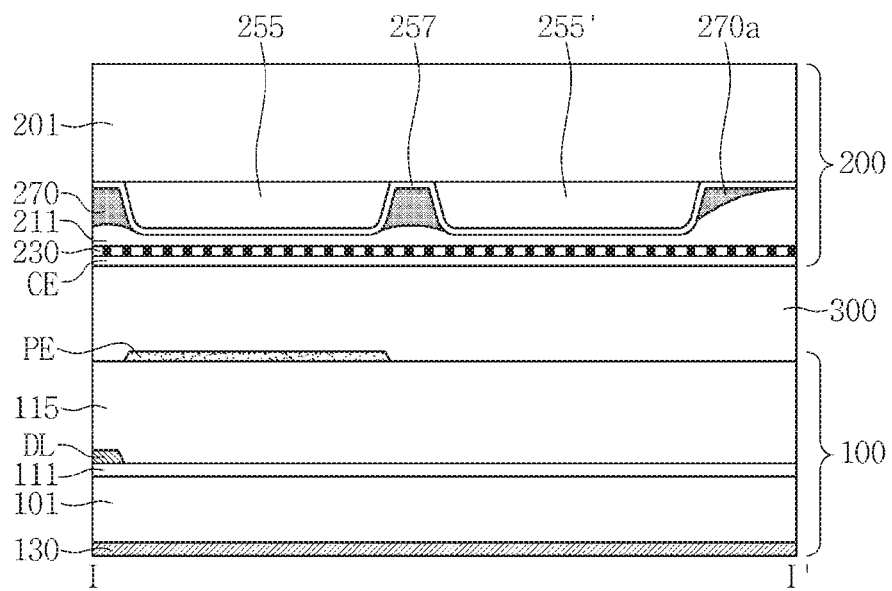

FIGS. 5A and 5B are cross-sectional views illustrating the non-display area of the display panel according to the first exemplary embodiment.

Referring to FIGS. 5A and 5B, the LCD device according to the first exemplary embodiment may include a dummy pattern 255' in the non-display area NDA of the upper substrate 201. The dummy pattern 255' may include substantially a same material as that included in the blue light blocking filter 251, the color pattern layer 253, and the transparent pattern layer 255. The dummy pattern 255' may contain a material for forming the black matrix 270 among the plurality of dummy patterns 255', among the dummy pattern 255' and the color pattern layer 253, and among the dummy pattern 255' and the transparent pattern layer 255, such that an area that a black matrix residual pattern 270a occupies may be reduced. For example, as illustrated in FIG. 5A, the dummy pattern 255' may include a plurality of dummy patterns 255' having different heights. In an alternative exemplary embodiment, as illustrated in FIG. 5B, the dummy pattern 255' may have substantially a same height as a height of the transparent pattern layer 255 in the display area DA of the upper substrate 201. However, exemplary embodiments are not limited thereto, and the number and height of the dummy patterns 255' may vary as necessary.

However, the first exemplary embodiment is not limited thereto, and the blue light blocking filter 251, the color pattern layer 253, the transparent pattern layer 255, the black matrix 270, the planarization layer 211, and the upper polarizer 230 may be disposed on the lower substrate 101.

Figure 6:
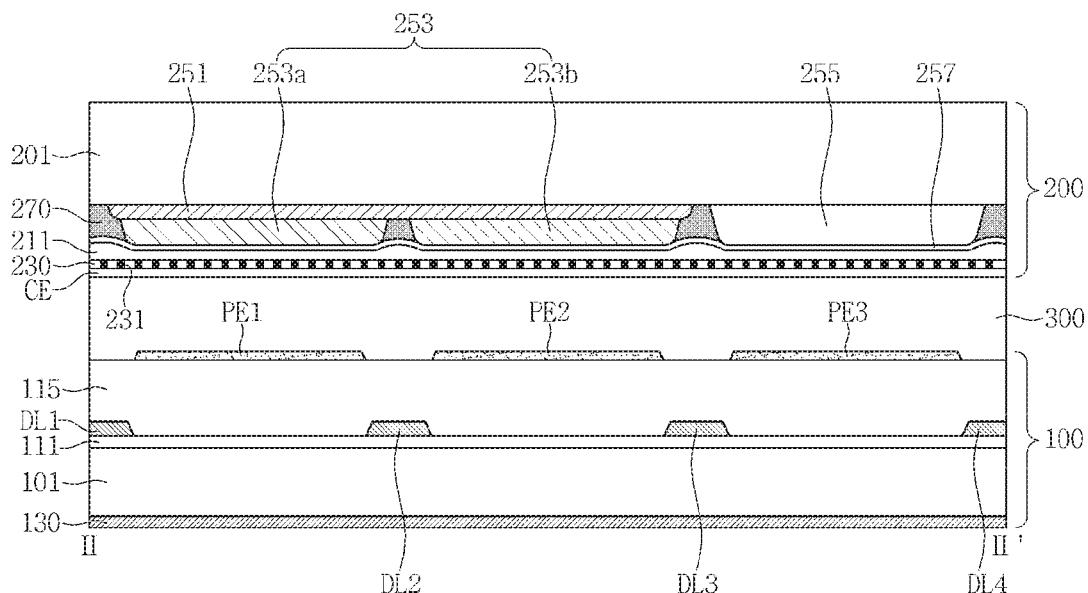
FIG. 6 is a cross-sectional view illustrating an LCD device according to a second exemplary embodiment.

FIG. 6 is a cross-sectional view illustrating an LCD device according to a second exemplary embodiment.

Repeated descriptions described hereinabove with respect to the LCD device according to the first exemplary embodiment will be omitted in the descriptions with respect to the LCD device according to the second exemplary embodiment.

Referring to FIG. 6, a dichroic reflection layer 257 may be disposed over an entire surface of an upper substrate 201 including a color pattern layer 253, a transparent pattern layer 255, and a black matrix 270. For example, the dichroic reflection layer 257 may be disposed among the planarization layer 211 and the color pattern layer 253, the transparent pattern layer 255, and the black matrix 270.

Figure 7:
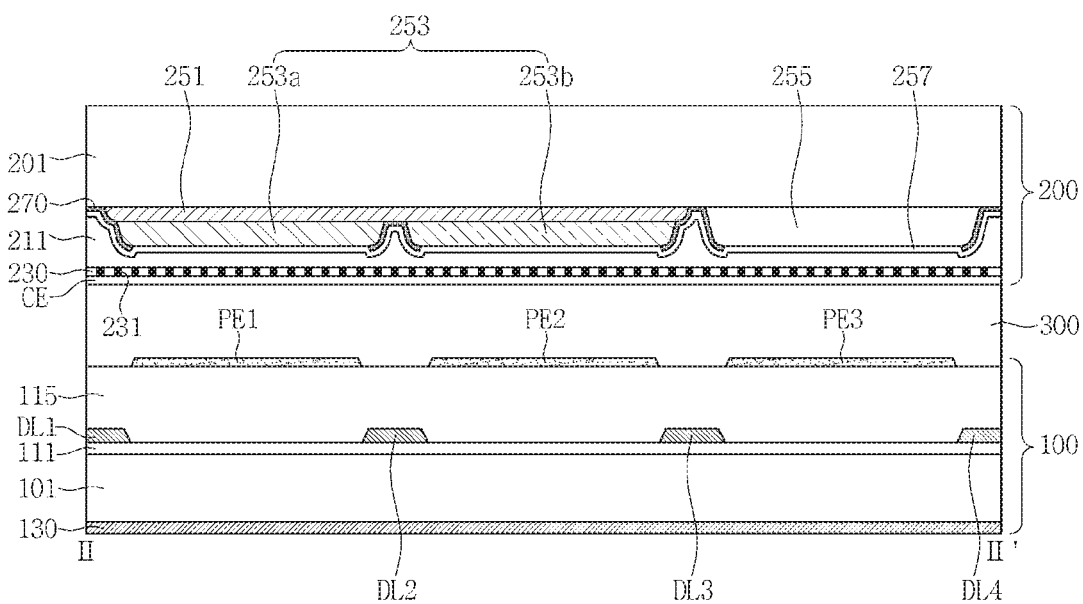
FIG. 7 is a cross-sectional view illustrating an LCD device according to a third exemplary embodiment.

FIG. 7 is a cross-sectional view illustrating an LCD device according to a third exemplary embodiment.

Repeated descriptions described hereinabove with respect to the LCD devices according to the first and second exemplary embodiments will be omitted in the descriptions with respect to the LCD device according to the third exemplary embodiment.

Referring to FIG. 7, a black matrix 270 may include a metal layer. The black matrix 270 including the metal layer blocks light incident thereto from a backlight unit 500 from being emitted toward a front surface of a display panel 10. In addition, a light emitted from a color pattern layer 253 toward a side surface of the color pattern layer 253 may be reflected by the black matrix 270 including the metal layer to be emitted toward the front surface of the display panel 10. Accordingly, the LCD device according to the third exemplary embodiment may be improved in terms of light emission efficiency.

FIGS. 8A, 8B, 8C, 8D, and 8E are cross-sectional views illustrating a method of manufacturing an LCD device according to a fourth exemplary embodiment. The method of manufacturing an LCD device according to the fourth exemplary embodiment will be described with reference to FIGS. 8A, 8B, 8C, 8D, and 8E.

Figure 8A:
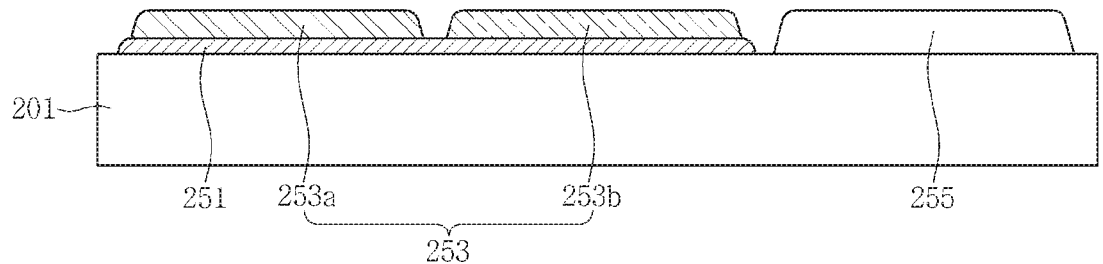
FIGS. 8A, 8B, 8C, 8D, and 8E are cross-sectional views illustrating a method of manufacturing an LCD device according to a fourth exemplary embodiment.

Referring to FIG. 8A, a blue light blocking filter 251, a color pattern layer 253, and a transparent pattern layer 255 are formed on an upper substrate 201. For example, the blue light blocking filter 251 is formed on the upper substrate 201, and then a red color conversion unit 253a and a green color conversion unit 253b are formed on the blue light blocking filter 251, spaced apart from each other in a plan view. The transparent pattern layer 255 is formed on the upper substrate 201 to be spaced apart from the blue light blocking filter 251 in a plan view.

Figure 8B:
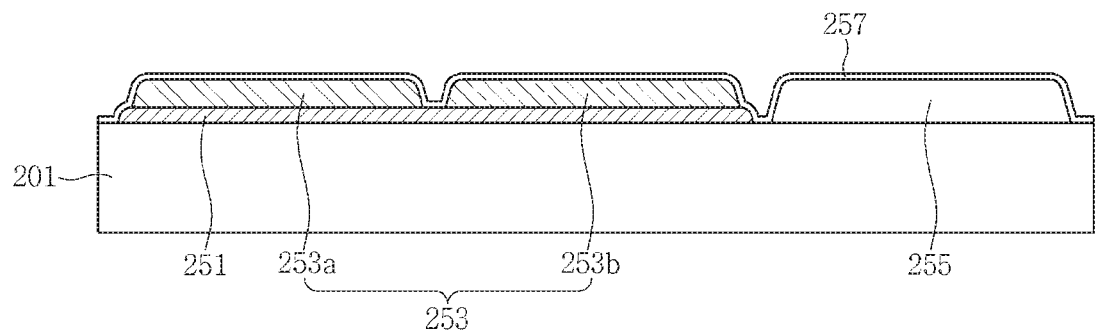

Referring to FIG. 8B, a dichroic reflection layer 257 is formed over an entire surface of the upper substrate 201 including the blue light blocking filter 251, the color pattern layer 253, and the transparent pattern layer 255.

Figure 8C:
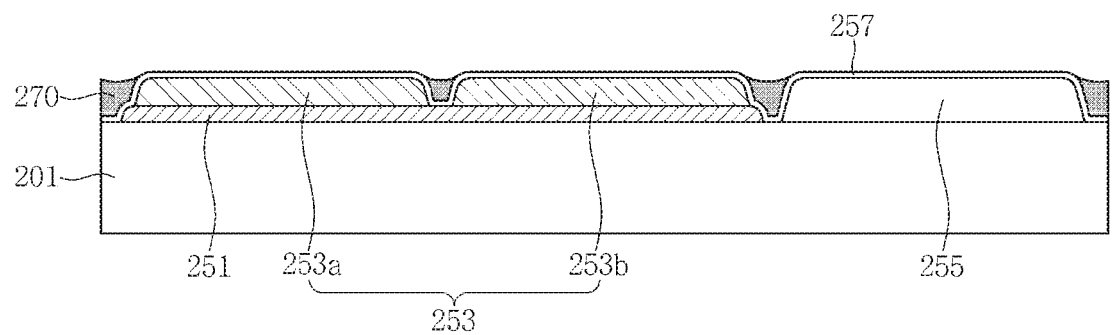

Referring to FIG. 8C, a black matrix 270 is formed among the plurality of color pattern layers 253 and the transparent pattern layer 255. For example, a black matrix forming material which includes an organic material is coated on the dichroic reflection layer 257 between the red color conversion unit 253a and the green color conversion unit 253b, between the green color conversion unit 253b and the transparent pattern layer 255, between the transparent pattern layer 255 and the red color conversion unit 253a, and between the blue light blocking filter 251 and the transparent pattern layer 255. The coated black matrix forming material is dissolved by a developing solution through multiple steps to be self-aligned precisely. In an exemplary embodiment, in addition, light emission efficiency may be improved by increasing an area of the color pattern layer 253 through which light is emitted. In the method of manufacturing the LCD device according to the fourth exemplary embodiment, the black matrix 270 may be self-aligned, and thus a manufacturing process using a mask may be omitted. Accordingly, manufacturing costs of the LCD device may be reduced.

Figure 8D:
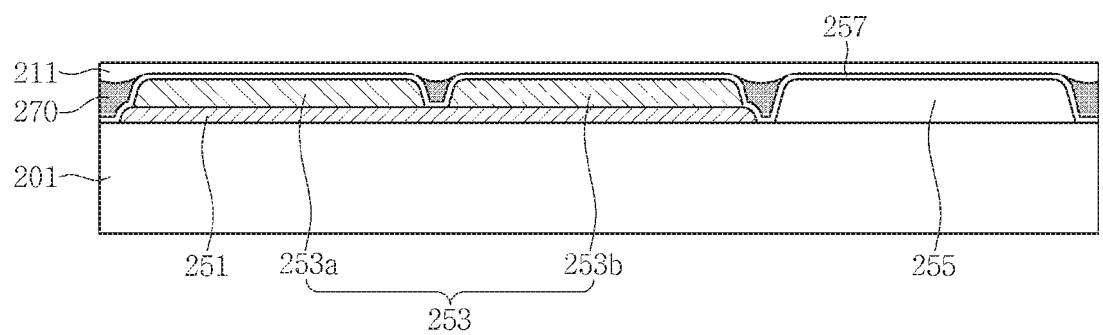

Referring to FIG. 8D, a planarization layer 211 is formed on the dichroic reflection layer 257 and the black matrix 270. In the method of manufacturing the LCD device according to the fourth exemplary embodiment, flatness of the planarization layer 211 may be improved by the black matrix 270 among the plurality of color pattern layers 253 and the transparent pattern layer 255.

Figure 8E:
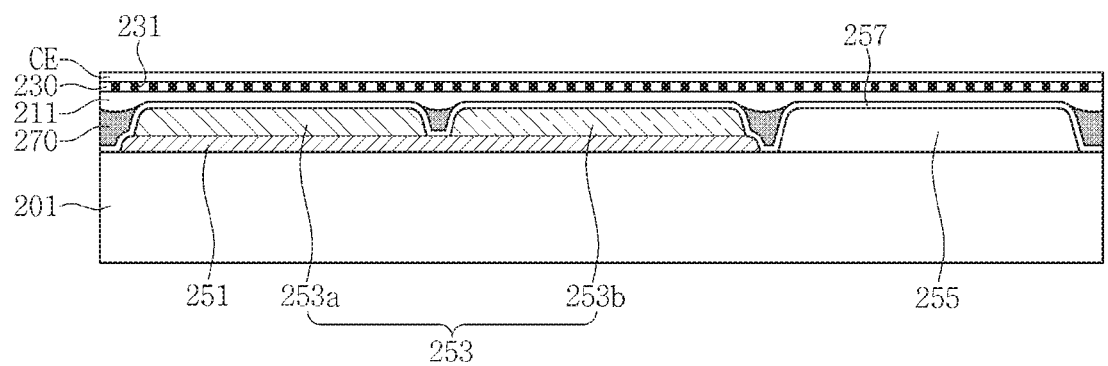

Referring to FIG. 8E, an upper polarizer 230 and a common electrode CE are formed on the planarization layer 211. For example, the upper polarizer 230 is formed on the planarization layer 211. The upper polarizer 230 includes a linear polarizer 231. The linear polarizer 231 may be formed by methods such as an imprinting method using a mold or a photolithography method. However, exemplary embodiments are not limited thereto, and the linear polarizer 231 may be formed using a block copolymer. The common electrode CE is formed on the upper polarizer 230. The common electrode CE may be formed in methods known in the pertinent art. Accordingly, an upper panel 200 may be provided.

FIGS. 9A, 9B, 9C, 9D, and 9E are cross-sectional views illustrating a method of manufacturing an LCD device according to a fifth exemplary embodiment. The method of manufacturing an LCD device will be described with reference to FIGS. 9A, 9B, 9C, 9D, and 9E.

Figure 9A:
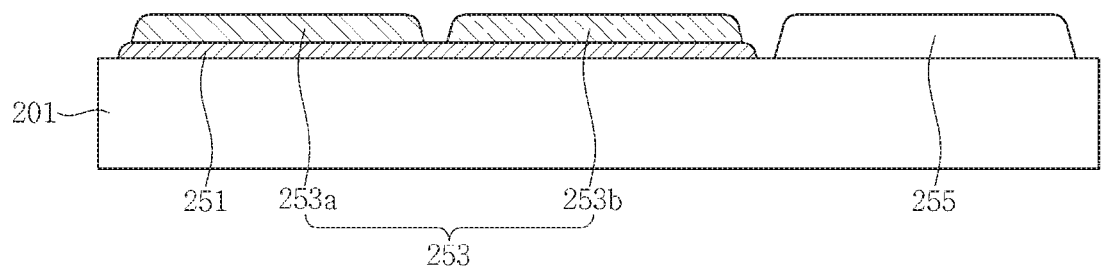
FIGS. 9A, 9B, 9C, 9D, and 9E are cross-sectional views illustrating a method of manufacturing an LCD device according to a fifth exemplary embodiment.

Referring to FIG. 9A, a blue light blocking filter 251, a color pattern layer 253, and a transparent pattern layer 255 are formed on an upper substrate 201. For example, the blue light blocking filter 251 is formed on the upper substrate 201, and then a red color conversion unit 253a and a green color conversion unit 253b are formed on the blue light blocking filter 251, spaced apart from each other in a plan view. The transparent pattern layer 255 is formed on the upper substrate 201 to be spaced apart from the blue light blocking filter 251 in a plan view.

Figure 9B:
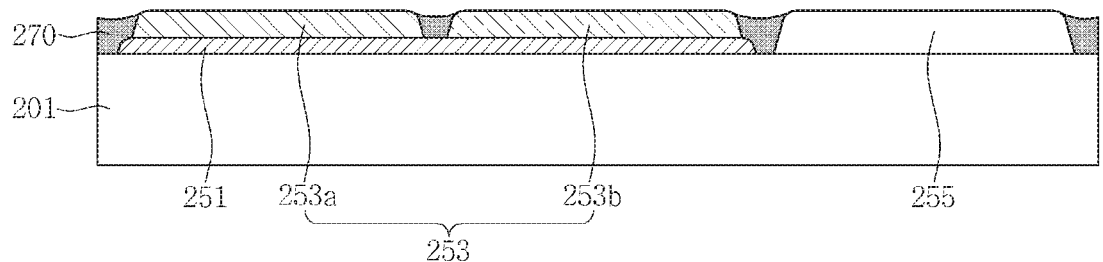

Referring to FIG. 9B, a black matrix 270 is formed among the blue light blocking filter 251, the plurality of color pattern layers 253, and the transparent pattern layer 255. For example, a black matrix forming material which includes an organic material is coated between the red color conversion unit 253a and the green color conversion unit 253b, between the green color conversion unit 253b and the transparent pattern layer 255, between the transparent pattern layer 255 and the red color conversion unit 253a, and between the blue light blocking filter 251 and the transparent pattern layer 255. The coated black matrix forming material is dissolved by a developing solution through multiple steps to be self-aligned precisely. In an exemplary embodiment, in addition, light emission efficiency may be improved by increasing an area of the color pattern layer 253 through which light is emitted. In the method of manufacturing the LCD device according to the fifth exemplary embodiment, the black matrix 270 may be self-aligned, and thus a manufacturing process using a mask may be omitted. Accordingly, manufacturing costs of the LCD device may be reduced.

Figure 9C:
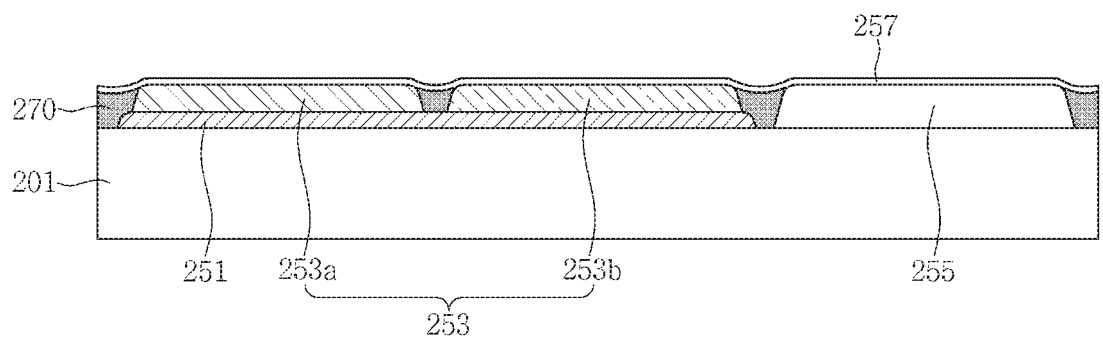

Referring to FIG. 9C, a dichroic reflection layer 257 is formed over an entire surface of the upper substrate 201 including the blue light blocking filter 251, the color pattern layer 253, the transparent pattern layer 255, and the black matrix 270.

Figure 9D:
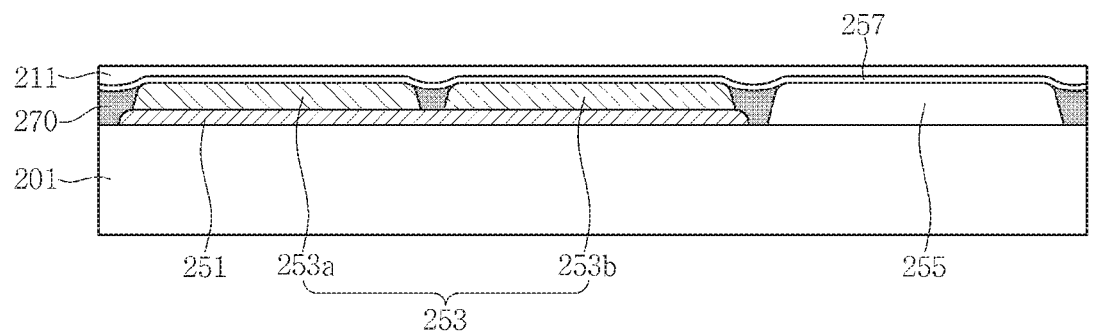

Referring to FIG. 9D, a planarization layer 211 is formed on the dichroic reflection layer 257. In the method of manufacturing the LCD device according to the fifth exemplary embodiment, flatness of the planarization layer 211 may be improved by the black matrix 270 among the plurality of color pattern layers 253 and the transparent pattern layer 255.

Figure 9E:
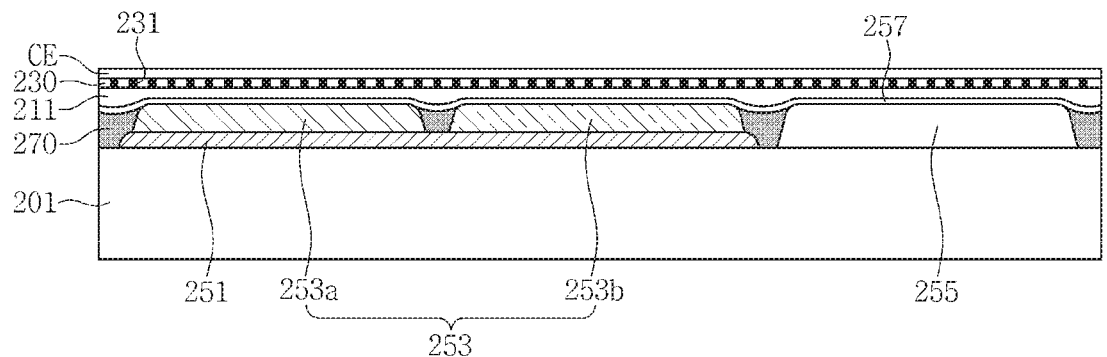

Referring to FIG. 9E, an upper polarizer 230 and a common electrode CE are formed on the planarization layer 211. For example, the upper polarizer 230 is formed on the planarization layer 211, and the common electrode CE is formed on the upper polarizer 230.

FIGS. 10A, 10B, 10C, 10D, 10E, and 10F are cross-sectional views illustrating a method of manufacturing an LCD device according to a sixth exemplary embodiment. The method of manufacturing an LCD device according to the sixth exemplary embodiment will be described with reference to FIGS. 10A, 10B, 10C, 10D, 10E, and 10F.

Figure 10A:
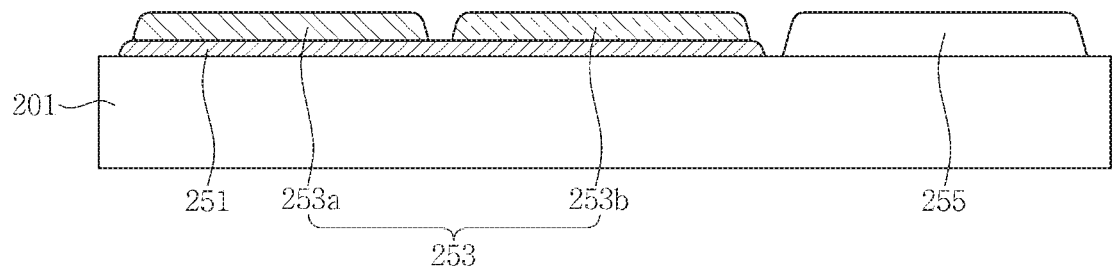
FIGS. 10A, 10B, 10C, 10D, 10E, and 10F are cross-sectional views illustrating a method of manufacturing an LCD device according to a sixth exemplary embodiment.

Referring to FIG. 10A, a blue light blocking filter 251, a color pattern layer 253, and a transparent pattern layer 255 are formed on an upper substrate 201. For example, the blue light blocking filter 251 is formed on the upper substrate 201, and then a red color conversion unit 253a and a green color conversion unit 253b are formed on the blue light blocking filter 251, spaced apart from each other in a plan view. The transparent pattern layer 255 is formed on the upper substrate 201 to be spaced apart from the blue light blocking filter 251 in a plan view.

Figure 10B:
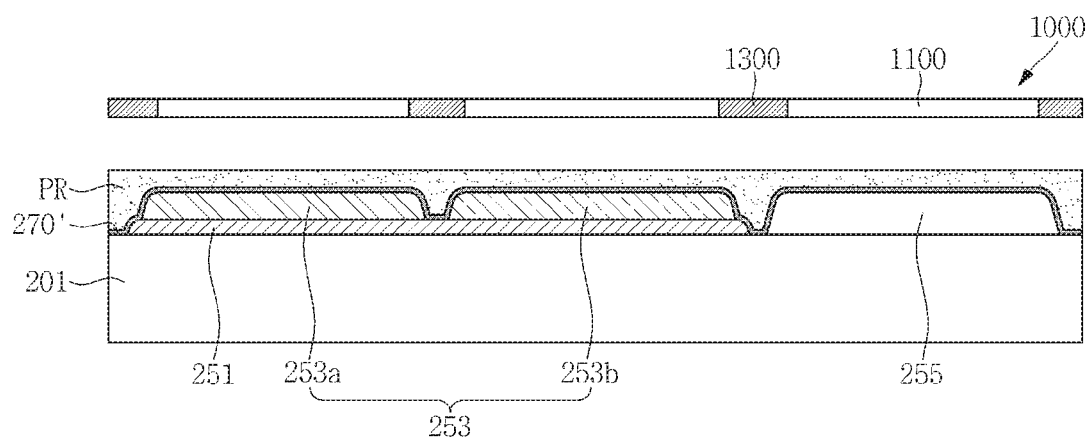

Referring to FIG. 10B, a black matrix forming material 270' is coated over an entire surface of the upper substrate 201 including the blue light blocking filter 251, the plurality of color pattern layers 253, and the transparent pattern layer 255.

Subsequently, a photoresist PR is coated over the entire surface of the upper substrate 201 on which the black matrix forming material 270' is coated, and a mask 1000 is disposed above the photoresist PR to be spaced apart from the photoresist PR. The mask 1000 is a two-tone mask including portions having different light transmittances. A light transmissive portion 1100 may have a light transmittance of about 95% or more, and a light blocking portion 1300 may have a light transmittance of about 5% or less. The light blocking portion 1300 of the mask 1000 may be disposed above an area to be formed with a black matrix 270, and the transmissive portion 1100 may be disposed above an area other than the area to be formed with the black matrix 270. Light irradiation is performed using the mask 1000, and then development and curing are performed.

Subsequently, the photoresist PR below the transmissive portion 1100 is completely removed such that the black matrix forming material 270' is exposed.

Figure 10C:
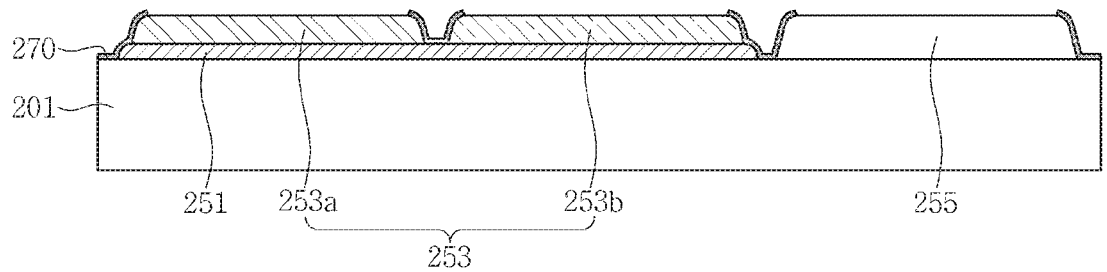

Referring to FIG. 10C, the black matrix forming material 270' is etched using an etching solution to be patterned such that the black matrix 270 is formed.

Figure 10D:
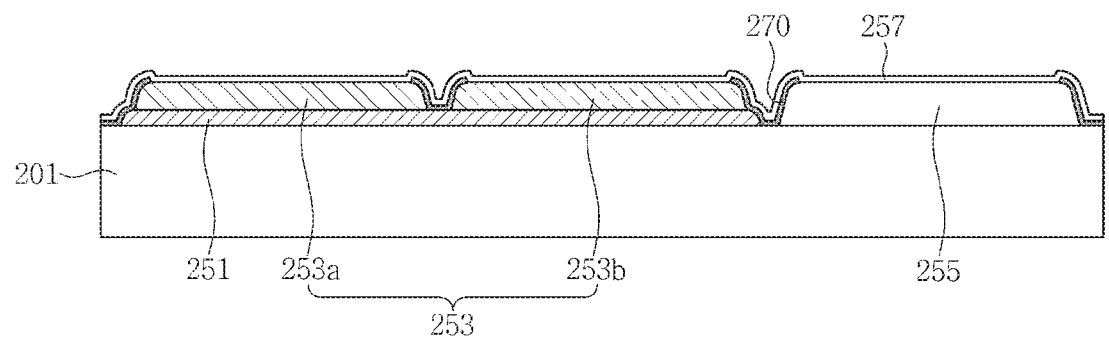

Referring to FIG. 10D, a dichroic reflection layer 257 is formed over the entire surface of the upper substrate 201 including the blue light blocking filter 251, the color pattern layer 253, the transparent pattern layer 255, and the black matrix 270.

Figure 10E:
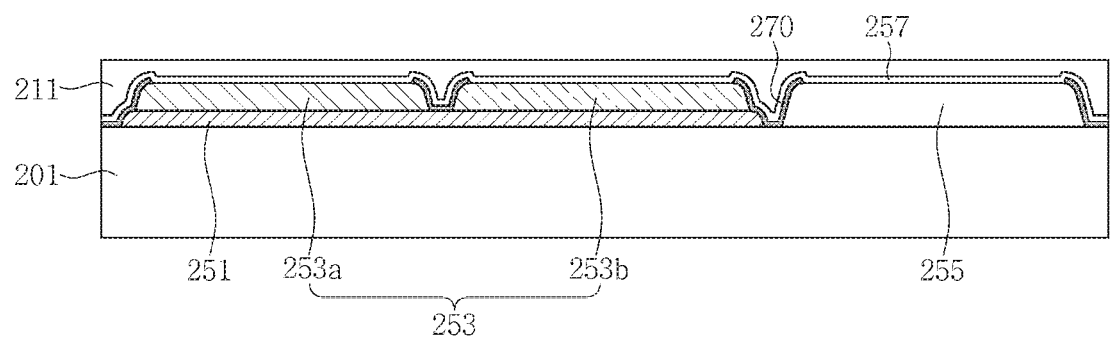

Referring to FIG. 10E, a planarization layer 211 is formed on the dichroic reflection layer 257 and the black matrix 270.

Figure 10F:
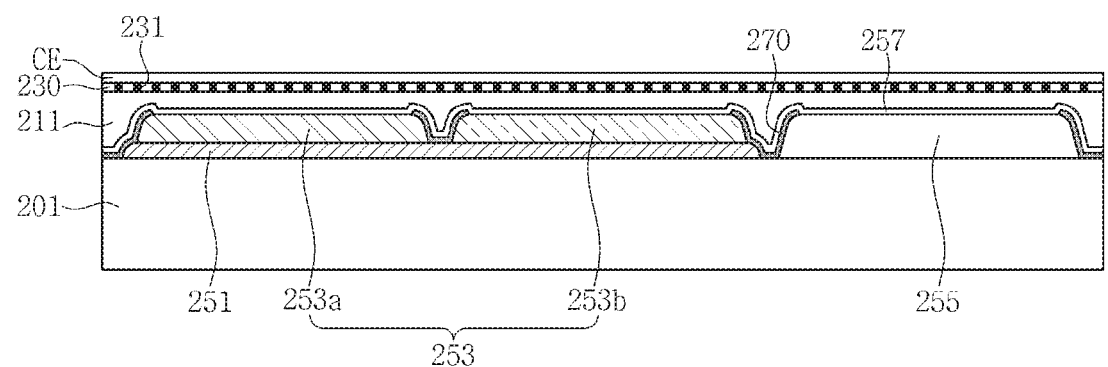

Referring to FIG. 10F, an upper polarizer 230 and a common electrode CE are formed on the planarization layer 211. For example, the upper polarizer 230 is formed on the planarization layer 211, and the common electrode CE is formed on the upper polarizer 230.

As set forth hereinabove, in one or more exemplary embodiments, an LCD device and a method of manufacturing the LCD device may provide the following effects.

A black matrix may significantly reduce color mixture by preventing a light transmitted through one color pattern layer or one transparent pattern layer from being incident to another color pattern layer or another transparent pattern layer.

Flatness of a planarization layer may be improved by a black matrix between the plurality of color pattern layers and the transparent pattern layer.

Light emission efficiency may be improved through self-aligning and by increasing an area of the color pattern layer.

A light emitted toward a side surface of the color pattern layer is reflected by the black matrix including a metal layer to be emitted toward the front of a display panel. Accordingly, light emission efficiency may be improved.

Since the black matrix includes a non-photosensitive organic material, a mask which may be required for light exposure may be omitted. Accordingly, manufacturing costs of the LCD device may be reduced.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
    a first substrate comprising a display area;
    a blue light blocking filter on the first substrate;
    a color pattern layer comprising a red color conversion layer on the blue light blocking filter and a green color conversion layer on the blue light blocking filter; and
    a metal layer between the red color conversion layer and the green color conversion layer in a plan view,
    wherein the metal layer comprises:
        a base portion;
        a first extension portion extending from a first edge of the base portion; and
        a second extension portion extending from a second edge of the base portion,
            wherein the first and second extension portions have round-shaped cross sections, respectively, and
            wherein a convex portion of the first extension portion and a convex portion of the second extension portion protrude toward each other.

2. The display device as claimed in claim 1, further comprising:
    wherein a planarization layer on the color pattern layer and the metal layer; and
    a polarizer on the planarization layer, the polarizer being in direct contact with the planarization layer.

3. The display device as claimed in claim 2, wherein the polarizer comprises a linear polarizer, and the linear polarizer is a wire grid polarizer (WGP).

4. The display device as claimed in claim 1, wherein the red color conversion layer and the green color conversion layer comprise wavelength converting particles.

5. The display device as claimed in claim 4, wherein the wavelength converting particle comprises at least one of: a phosphor, a quantum dot particle, or a quantum rod particle.

6. The display device as claimed in claim 2, further comprising:
    a light source unit configured to emit a blue light; and
    a transparent pattern layer spaced apart from the blue light blocking filter in a plan view to contact the first substrate.

7. The display device as claimed in claim 6, wherein the metal layer is further disposed between the color pattern layer and the transparent pattern layer.

8. The display device as claimed in claim 1, further comprising a light source unit configured to emit an ultraviolet light,
    wherein the color pattern layer further comprises a blue color conversion layer spaced apart from the blue light blocking filter in a plan view to contact the first substrate and configured to convert a light into a light having a blue wavelength.

9. The display device as claimed in claim 6, further comprising a dichroic reflection layer among the metal layer and the blue light blocking filter, the color pattern layer, and the transparent pattern layer.

10. The display device as claimed in claim 6, further comprising a dichroic reflection layer among the planarization layer and the blue light blocking filter, the color pattern layer, the transparent pattern layer, and the metal layer.

11. The display device as claimed in claim 1, further comprising a dummy pattern in a non-display area of the first substrate.

12. The display device as claimed in claim 11, wherein the metal layer is further disposed on the non-display area of the first substrate such that the metal layer is adjacent to the dummy patterns.

13. The display device as claimed in claim 1, further comprising a second substrate facing the first substrate and a data line on the second substrate.

14. The display device as claimed in claim 13, wherein the metal layer includes a groove recessed toward the first substrate,
    the groove is defined by the base portion, the first extension portion and the second extension portion.

15. The display device as claimed in claim 1, wherein the metal layer includes a plurality of metal layers spaced apart from each other, and at least one metal layer contacts the first substrate.

16. A method of manufacturing a display device, the method comprising:
    forming a blue light blocking filter on a substrate;
    forming a color pattern layer and a transparent pattern layer on the substrate;
    forming a black matrix on the substrate;
    forming a planarization layer on the substrate; and
    forming a polarizer on the substrate,
    wherein the color pattern layer comprises wavelength converting particles, and
    wherein the black matrix comprises:
        a base portion on the first substrate;
        a first extension portion extending from a first edge of the base portion; and
        a second extension portion extending from a second edge of the base portion,
            wherein the first and second extension portions have round-shaped cross sections, respectively, and
            wherein a convex portion of the first extension portion and a convex portion of the second extension portion protrude toward each other.

17. The method as claimed in claim 16, further comprising forming a dichroic reflection layer on the substrate before forming the planarization layer.

18. The method as claimed in claim 16, further comprising forming a dichroic reflection layer on the substrate before forming the polarizer.

19. The method as claimed in claim 16, wherein forming of the black matrix on the substrate comprises:
    coating a black matrix forming material;
    coating a photoresist;
    developing the photoresist;
    etching the black matrix forming material; and
    stripping the photoresist,
    wherein the black matrix forming material comprises a metal.

20. The method as claimed in claim 16, wherein forming of the color pattern layer and the transparent pattern layer on the substrate further comprises:
    forming a dummy pattern.

21. The display device as claimed in claim 1, wherein the metal layer reflects light emitted from the color pattern layer toward a side surface of the color pattern layer to be emitted toward a front surface of the first substrate.

* * * * *